(12) United States Patent
Berry

(10) Patent No.: US 11,772,945 B1
(45) Date of Patent: Oct. 3, 2023

(54) STRADDLE FORK VEHICLE

(71) Applicant: John G. Berry, Camarillo, CA (US)

(72) Inventor: John G. Berry, Camarillo, CA (US)

( * ) Notice: Subject to any disclaimer, the term of this patent is extended or adjusted under 35 U.S.C. 154(b) by 0 days.

(21) Appl. No.: 18/195,821

(22) Filed: May 10, 2023

Related U.S. Application Data

(60) Provisional application No. 63/343,250, filed on May 18, 2022.

(51) Int. Cl.
*B66F 9/06* (2006.01)
*B66F 9/08* (2006.01)
*B66F 9/075* (2006.01)

(52) U.S. Cl.
CPC .......... *B66F 9/085* (2013.01); *B66F 9/07509* (2013.01); *B66F 9/07577* (2013.01); *B66F 9/0759* (2013.01)

(58) Field of Classification Search
CPC .......... B66F 9/0759; B66F 9/07577; B66F 9/07509; B66F 9/085
See application file for complete search history.

(56) References Cited

U.S. PATENT DOCUMENTS

| | | | | |
|---|---|---|---|---|
| 3,039,637 A | * | 6/1962 | Akrep | B66F 9/06 414/631 |
| 3,765,546 A | * | 10/1973 | Westerling | B65G 59/062 414/933 |
| 3,861,535 A | * | 1/1975 | Huxley, III | A01D 46/243 180/242 |
| 4,067,393 A | * | 1/1978 | Szarkowski | B66F 9/082 180/215 |
| 4,921,075 A | * | 5/1990 | Schumacher | B66F 9/07563 187/229 |
| 5,480,275 A | * | 1/1996 | Talbert | B66F 9/07563 414/664 |
| 5,651,658 A | * | 7/1997 | Holmes | B66F 9/082 180/209 |
| 9,796,435 B1 | * | 10/2017 | Reyes | B66F 9/06 |
| 2015/0060199 A1 | * | 3/2015 | Overfield | B66F 11/04 182/69.4 |
| 2022/0379792 A1 | * | 12/2022 | Wehner | B66F 9/195 |

FOREIGN PATENT DOCUMENTS

DE 202004007099 U1 * 9/2004 .......... B66F 9/07554

\* cited by examiner

*Primary Examiner* — Michael A Riegelman
(74) *Attorney, Agent, or Firm* — YK Law, LLP; Michael A DiNardo; Iain Hill

(57) ABSTRACT

A straddle fork vehicle includes a generally rectangular frame structure with front and rear forklift assemblies positioned between a set of tread belts. The straddle fork vehicle is designed such that the frame may accommodate, or straddle, agricultural harvesting pallets between the set of treads in a passthrough through area beneath the frame as the vehicle progresses down a field row. Engine configuration and improved braking systems facilitate a safer construction and tighter turning radius.

20 Claims, 7 Drawing Sheets

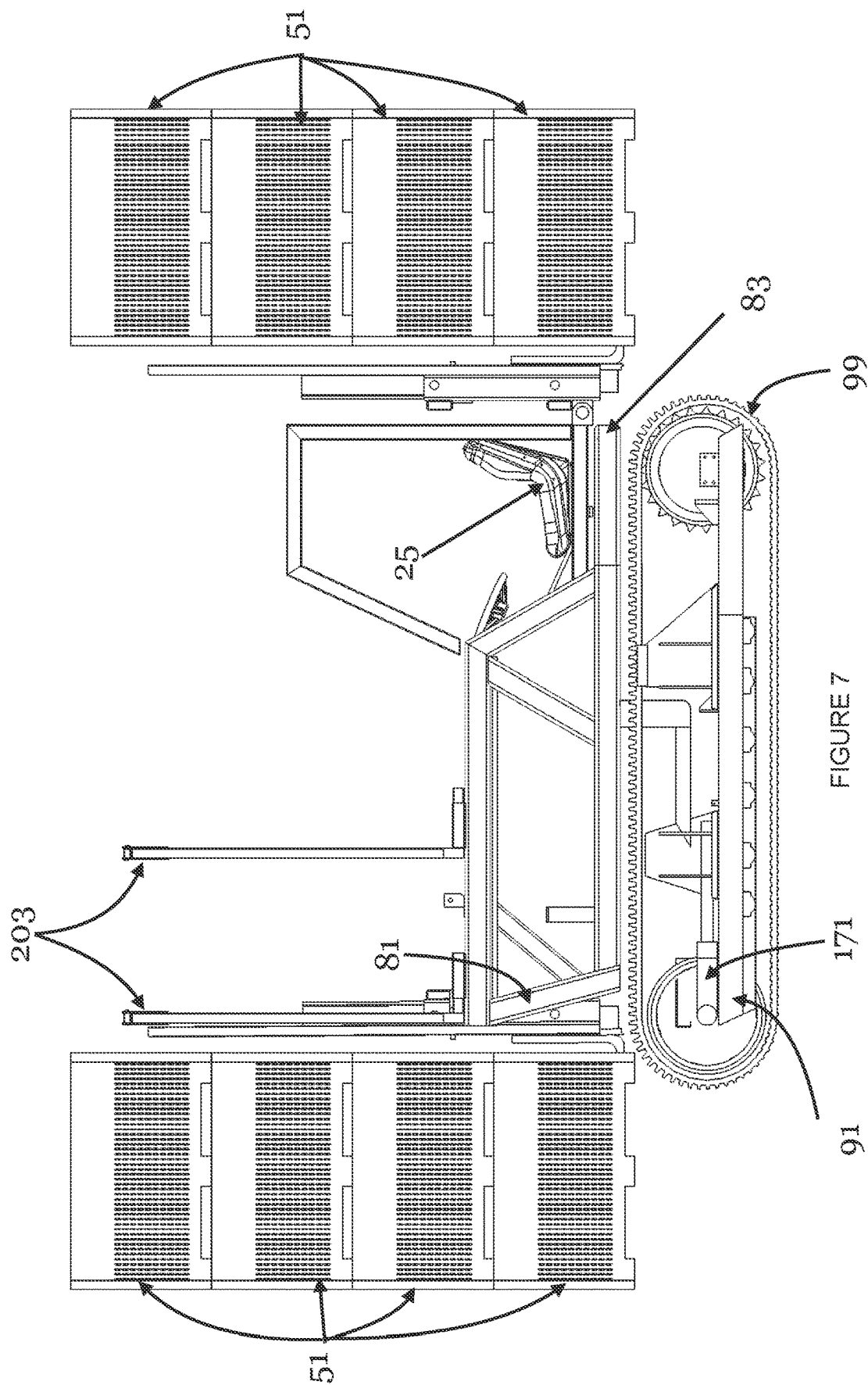

STRADDLE FORK VEHICLE

RELATED APPLICATIONS

This patent application relates to and claims priority from U.S. Provisional Patent Application No. 63/340,694 entitled "AG-STRADDLE FORK VEHICLE" filed May 11, 2022 and is incorporated herein by reference including its specification.

FIELD OF THE INVENTION

Embodiments of the disclosure relate generally to agricultural vehicles. More particularly embodiments of the present disclosure relate to agricultural forklift vehicles.

BACKGROUND OF THE INVENTION

The present invention is directed to an improved straddle fork vehicle primarily for use in agricultural fields or similar settings where one has need to gather and carry multiple collection bins laid out in series in the middle of a row. The improved straddle fork vehicle can gather and carry more bins, more efficiently, while causing less unintentional damage to the fields. The improved straddle fork vehicle is more easily controlled in its movement and is also more environmentally "friendly".

As described in U.S. Pat. No. 3,861,535 for a straddle fork vehicle, the prior art already contains knowledge of straddle fork vehicles of certain designs. Such prior art vehicles have utility in agricultural fields, but also have their limitations.

Conventional field harvesting methods such as those used in citrus groves or similar crops have evolved from the use of field boxes to the use of pallet bins or similar containers disposed along the rows of groves or orchards. Such pallet bins designed for bulk handling of crops are approximately four feet by four feet by four feet deep and can be transported about by conventional forklifts in the manner of usual pallets, typically containing the equivalent of 17 to 18 field boxes. The harvested crops are placed into the pallet bins either manually or through automated means. For bulk handling, those pallet bins must be collected by fork vehicles in the most efficient manner possible with as little disturbance to the grove, its rows, or the plants.

The basic frame structure of the prior art fork vehicle includes front and rear wheels mounted to the lower front and rear corner portions of the frame structure—spaced relative to the frame structure and to each other to provide a vertical clearance between the underside of the frame structure and the ground of greater height than the height of a pallet bin, particularly between the wheels such that the pallet bins are "straddled" by the fork vehicle.

With the foregoing arrangement, the fork vehicle can ride over a pallet bin, the wheels passing on either side of the bin in a straddling configuration. The pallet bins may then be selectively collected from along the rows, and the crop transferred to a central warehouse for processing and storing.

Such prior art fork vehicles suffer from many disadvantages. Because of its configuration, the prior art vehicles are inefficient—able to only carry a limited number of pallet bins—thus requiring more trips to gather pallet bins from a single row, which typically contain dozens of bins depending upon the length of the row. Because of the configuration of the vehicle and the rows, the vehicle must completely traverse any row before turning around, thus any limit on the number of bins that can be carried increases the inefficiency.

The configuration of wheels on the prior art vehicles creates pressure points in the rows of the fields, often compacting the ground or creating ruts, especially when the ground is wet or muddy. Furthermore, the configuration and drive train of the prior art vehicles means a large turning radius, often requiring multiple-point turns to turn a vehicle around or simply turn down an adjacent row. The brake systems of such prior art vehicles have proven unreliable over the years, resulting in failures where vehicles are unrestrained or hazardous brake fluid is released to the environment. The engines of such prior art vehicles are also inefficient producing copious amounts of pollution and green house gases.

Accordingly, there is a need for an improved straddle forklift vehicle. The present invention fulfills these needs and provides other related advantages.

SUMMARY OF THE INVENTION

The present invention is directed to a straddle fork vehicle for harvesting agricultural pallets. It may have a vehicle frame structure with a first end and a second end opposite the first end. An operator cabin is at the second end. The vehicle may have an eco-engine near and operationally connected to the operator cabin. Also, the eco-engine is functionally coupled to a nearby hydraulic cooling fan assembly. The vehicle may optionally have a soil ripper.

The vehicle may have a first fork assembly mounted on the first end and a second fork assembly mounted on the second end. Each fork assembly is movable vertically relative to the vehicle frame structure. The vehicle may optionally have a soil ripper assembly attached to either the first fork assembly or the second fork assembly. A pair of adjustment rails may be longitudinally disposed at the first end extending toward the second end.

A track drive system comprised of a pair of tread belts longitudinally associates with and is externally attached to opposite sides of the vehicle frame structure. A hydraulic brake system is functionally coupled to the pair of tread belts and is operationally connected to the operator cabin. The pair of tread belts may comprise a plurality of steel treads or a plurality of rubber treads. The hydraulic brake system is configured to use charge pressure to release the brake system. The track drive system is operationally connected to the engine by a hydrostatic transmission. The pair of tread belts are each independently controllable by the hydrostatic transmission.

A straddle area defines a vertical clearance and a horizontal clearance beneath the vehicle frame structure that spans from the first end to the second end and between the pair of treads. The straddle area the straddle area may be configured to a height no less than four feet and width no less than four feet so as to accommodate the agricultural pallets as a passthrough.

The vehicle may further comprise a pair of adjustment rails longitudinally disposed at the first end extending toward the second end. The first fork assembly is mounted on the pair of adjustment rails. The first fork assembly is slidable along the pair of adjustment rails relative to the first end of the vehicle frame structure as needed to balance the straddle fork vehicle.

Other features and advantages of the present invention will become apparent from the following more detailed description, taken in conjunction with the accompanying drawings, which illustrate, by way of example, the principles of the invention.

BRIEF DESCRIPTION OF THE FIGURES

These and other features and advantages of the present invention will become appreciated, as the same becomes better understood with reference to the specification, claims and drawings herein:

FIG. 1 is a perspective view of a preferred embodiment of the Straddle fork vehicle of the present invention;

FIG. 7 is a side view of a preferred embodiment of the straddle fork vehicle of the present invention carrying four pallet boxes on both the front and rear forks.

DETAILED DESCRIPTION

Figure 1:
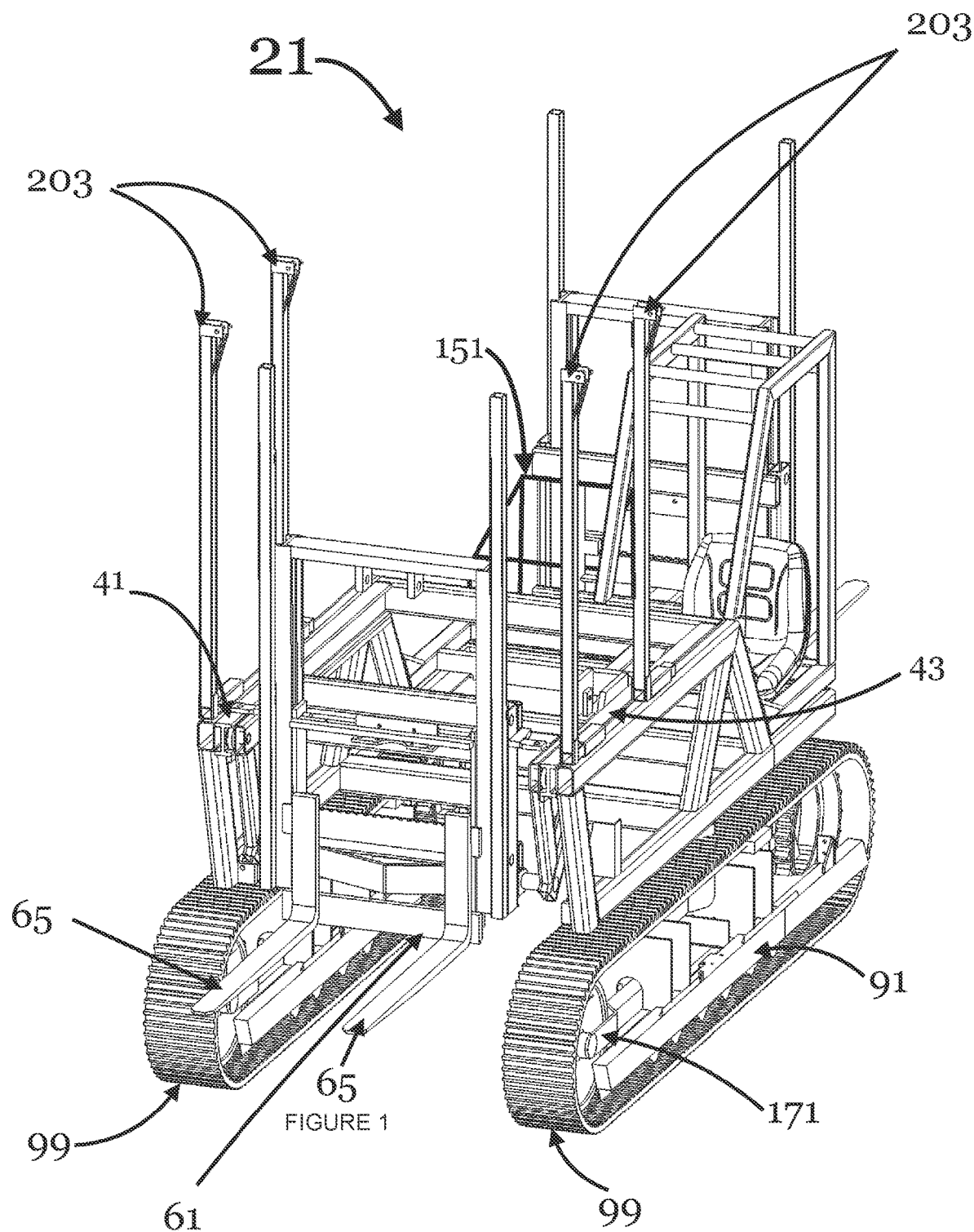
FIG. 1 is a perspective view of a preferred embodiment of an unweighted leg orthotic system of the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present there between. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

As used herein, the singular forms "a," "an," and "the," are intended to include the plural forms as well, unless the context clearly indicates otherwise. It will be further understood that the terms "comprises" and/or "comprising," "includes" and/or "including," and "have" and/or "having," when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," and "upper" or "top," "inner" or "outer," and "medial" or "lateral" may be used herein to describe one element's relationship to other elements as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

In the following detailed description, the straddle fork vehicle of the present disclosure generally referred to by reference character 21 is shown in FIGS. 1-7.

As shown in FIG. 1 the present invention is directed to an improved straddle fork vehicle 21 for picking up, transporting, and depositing pallet bins or boxes designed to hold produce during harvesting operations in orchards and similar crop fields. The straddle fork vehicle 21 of the type described includes a frame structure 23 of generally rectangular shape having a 22 and a second end 24. An open region occupies about two-thirds of the length of the straddle fork vehicle 21 at the first end 22, with a seat 25 generally disposed in an operator cabin or frame structure at the second end 24 that occupies the remaining one-third of the vehicle 21. When observed in top or plan view, the frame structure 23 includes a first frame rail 41 and a second frame rail 43 horizontally and longitudinally disposed in parallel and extending from the first end 22 toward the second end 24 of the frame structure 23. A plurality of securing members 203 about corners of the frame structure 23 may secure objects loaded upon the straddle fork vehicle.

As shown in FIG. 1 the first frame rail 41 and second frame rail 43 are spaced apart so as to define the open region, specifically defining a straddle area 45 within the frame structure 23 having a width 47 sufficient to accommodate a pallet bin 51. The straddle area 45 of the frame structure 23 also defines a vertical clearance allowing the vehicle 21 to pass over and accommodate field pallets 51 in agricultural fields. A first fork assembly 61 is mounted on the first end 22 of the frame structure 23, preferably on the first frame rail 41 and second frame rail 43 within the straddle area 45. The first fork assembly 61 has a set of fork prongs 65 extending forwardly of the vehicle 21 and is movable vertically up and down to pass between the first frame rail 41 and the second frame rail 43. The first forklift assembly 61 is also movable horizontally forward and backward along the first frame rail 41 and second frame rail 43. A second fork assembly 63 is mounted on the second end 24 of the vehicle 21 behind the operator cabin 27. The second fork assembly 63 has a set of fork prongs 65 extending rearwardly of the vehicle 21 and also movable vertically up and down.

Figure 4:
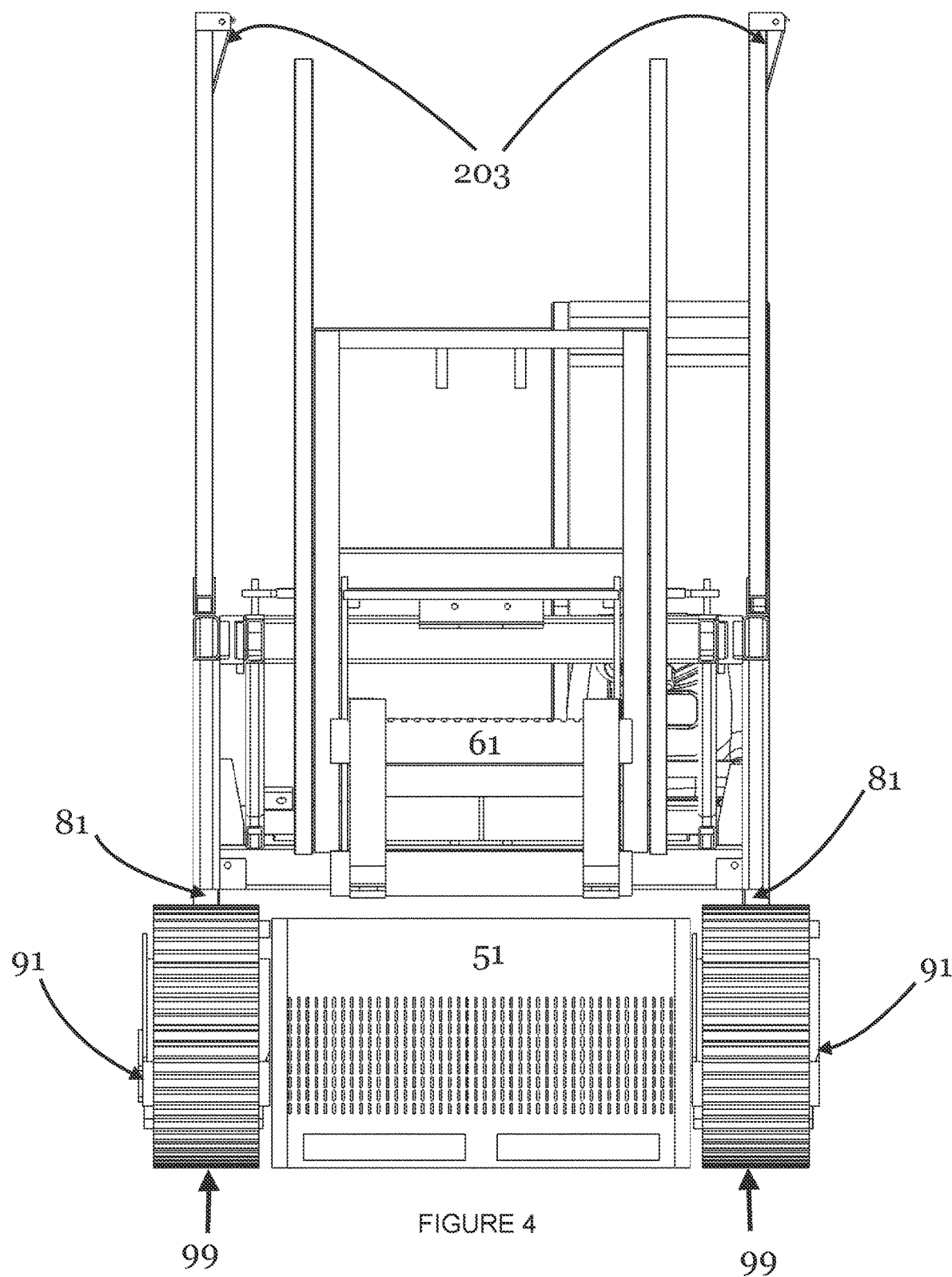
FIG. 4 is a front view of a preferred embodiment of the Straddle fork vehicle of the present invention straddling a pallet box.
Figure 6:
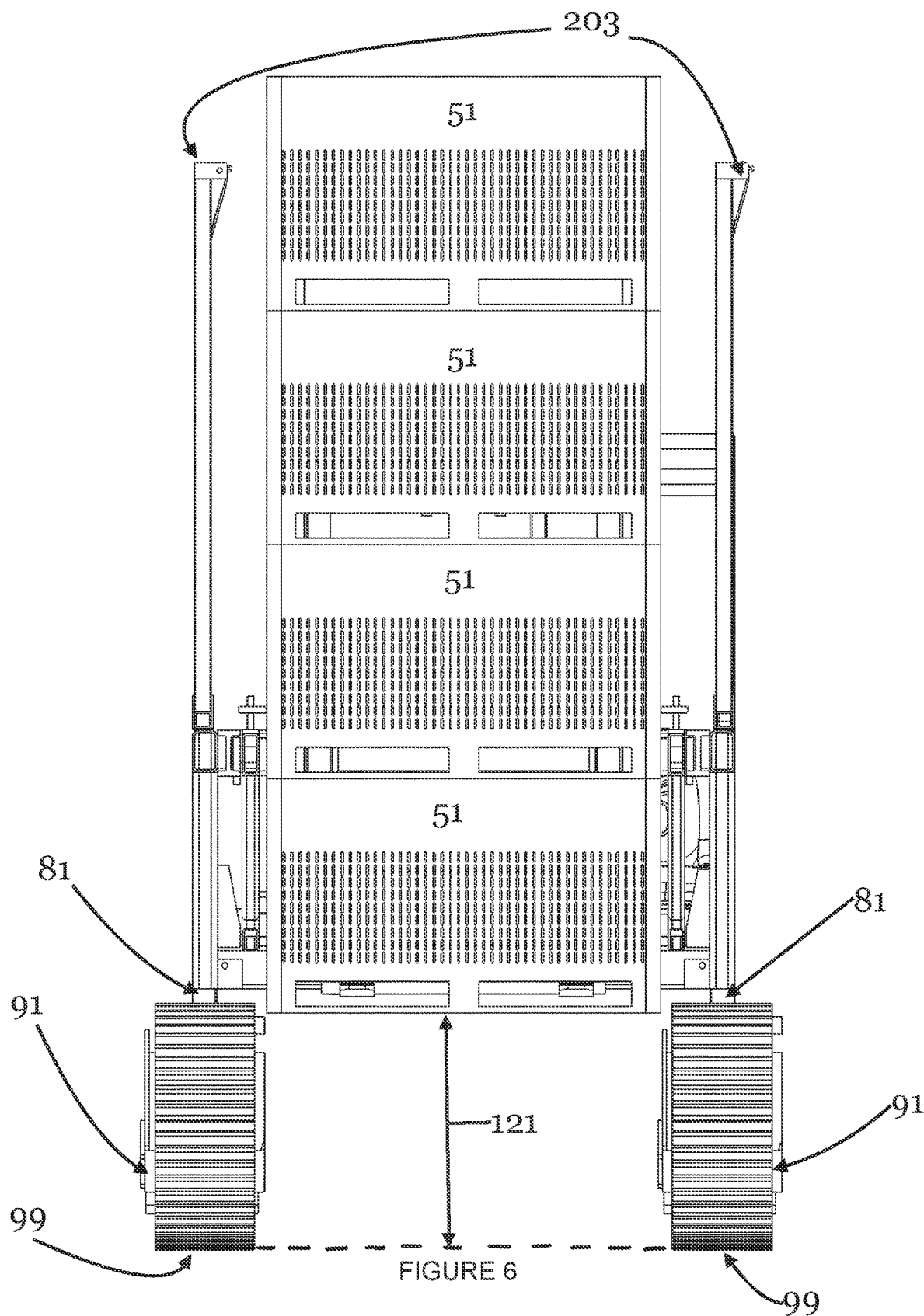
FIG. 6 is a front view of a preferred embodiment of the Straddle fork vehicle of the present invention carrying four pallet boxes on the front forks.

The straddle fork vehicle 21 is configured for use with a pallet bin 51 as shown in FIGS. 4, 6, and 7. The straddle fork vehicle 21 and straddle area 45 may be constructed to any desired dimension to correspond with various sized agricultural field rows. In preferred embodiments the pallet bins 51 are about 4 ft by 4 ft by 4 ft in dimension. These dimensions correspond to preferred straddle area dimensions of 4 ft by 4 ft.

Figure 2:
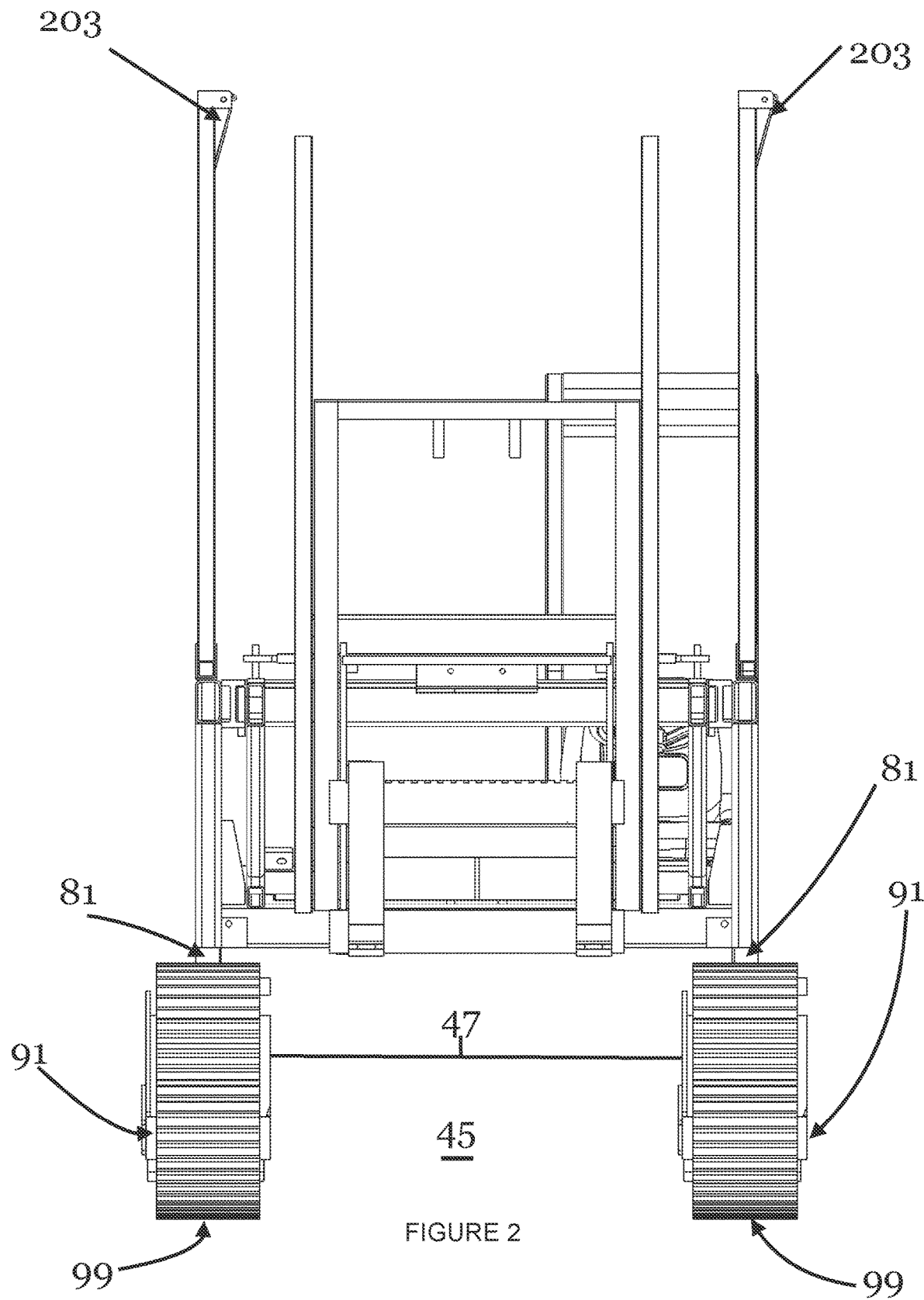
FIG. 2 is a front view of a preferred embodiment of the Straddle fork vehicle of the present invention.
Figure 3:
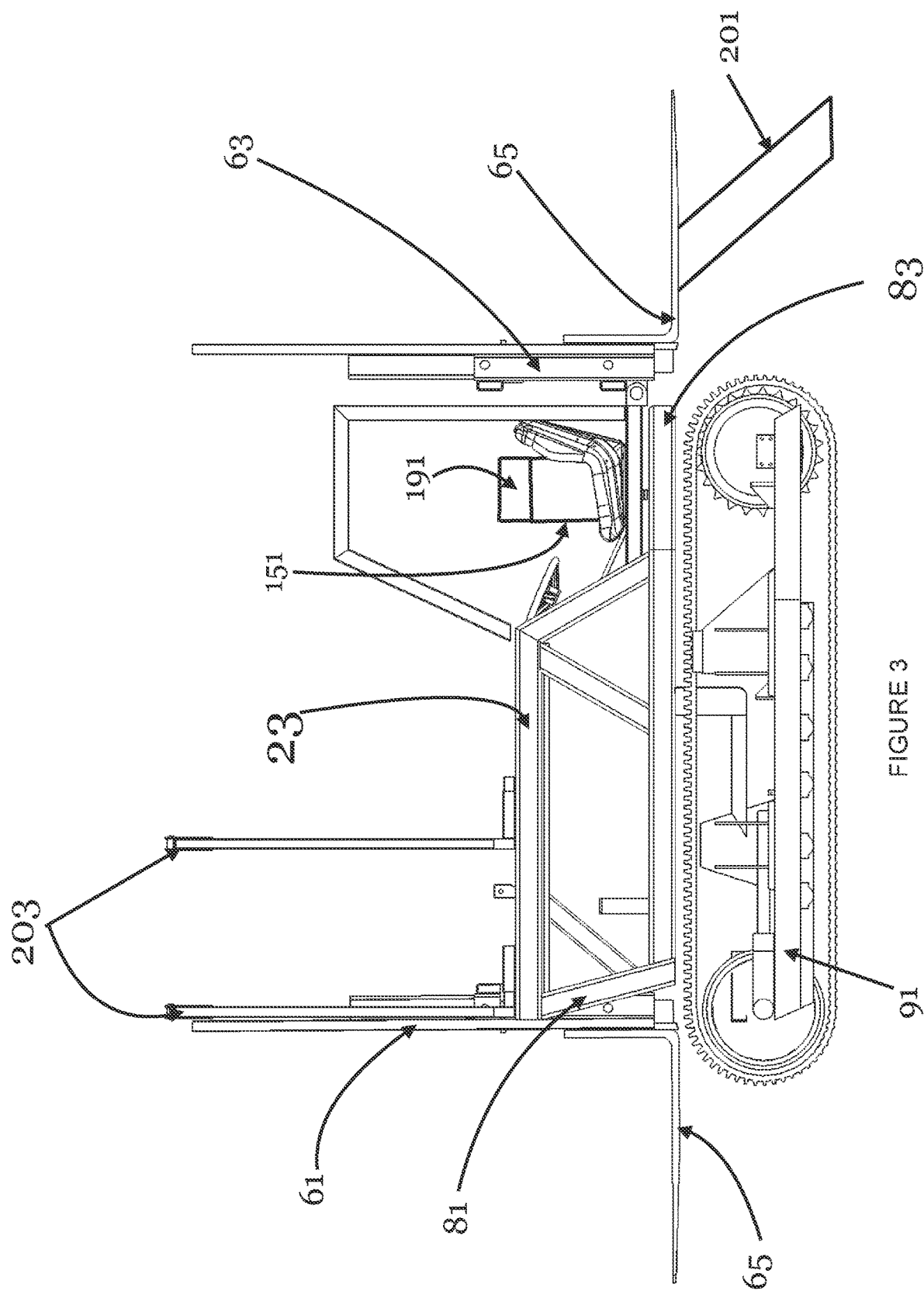
FIG. 3 is a side view of a preferred embodiment of the Straddle fork vehicle of the present invention.

As shown in FIGS. 2 and 3 the straddle fork vehicle 21 has a track drive system 91 mounted between a lower front frame structure corner 81 and a lower rear frame structure corner 83 of the frame structure 23 and the operator cabin 25. The track drive system 91 has a first tread belt 93 and second tread belt 95 disposed outside and on opposite sides of the frame structure 23, extending the length of the straddle fork vehicle 21. The track drive system 91 is entirely external to the straddle area 45 and frame structure 23. A set of steel treads 99 preferably runs along both the first tread belt 93 and second tread belt 95. The first tread belt 93 and second tread belt 95 may preferably include a rubber shoe set 97 bonded to the set of steel treads 99 so as to protect the treads from hard surfaces or hard surfaces such as asphalt from destruction by the bare steel.

Alternatively, the first tread belt 93 and second tread belt 95 can be replaced entirely with rubber treads 99 that function in a similar manner as the steel treads so as to provide greater protection against surfaces on which the vehicle 21 may drive, as shown in FIGS. 2 and 3. Unlike prior art tire drive systems, the track drive system 91 provides a distributed weight footprint, creating fewer soil damaging pressure points on the improved stability with improved traction to the operator, particularly on slopes or grades. The distributed weight footprint allows the vehicle 21 to carry a greater number of bins 51 with less compaction than prior art tire drive systems. The track drive system 91 also allows for counter-rotation steering, providing a smaller turning radius and more efficient operation of the fork straddle fork vehicle 21.

As shown in FIGS. 1-4 the track drive system 91, frame structure 23, and operator cabin 25 are configured to provide a vertical clearance 121 between the ground and the underside of the frame structure 23 and operator cabin 25. This is accomplished, in part, by the first tread belt 93 and second tread belt 95 being outside of the frame structure 23, and positioning the frame structure 23 and operator cabin 25 above the first tread belt 93 and second tread belt 95, with the vertical clearance 121 and straddle area 45 creating space under the straddle fork vehicle 21 passthrough for the bins 51.

As shown in FIGS. 1, 4 and 6 the straddle area 45 preferably has a height slightly greater than the height of a pallet bin 51 such that the straddle fork vehicle 21 can ride over a pallet bin 51 with the first tread belt 93 and second tread belt 95 passing on either side of the bin 51 in a straddling configuration.

Figure 5:
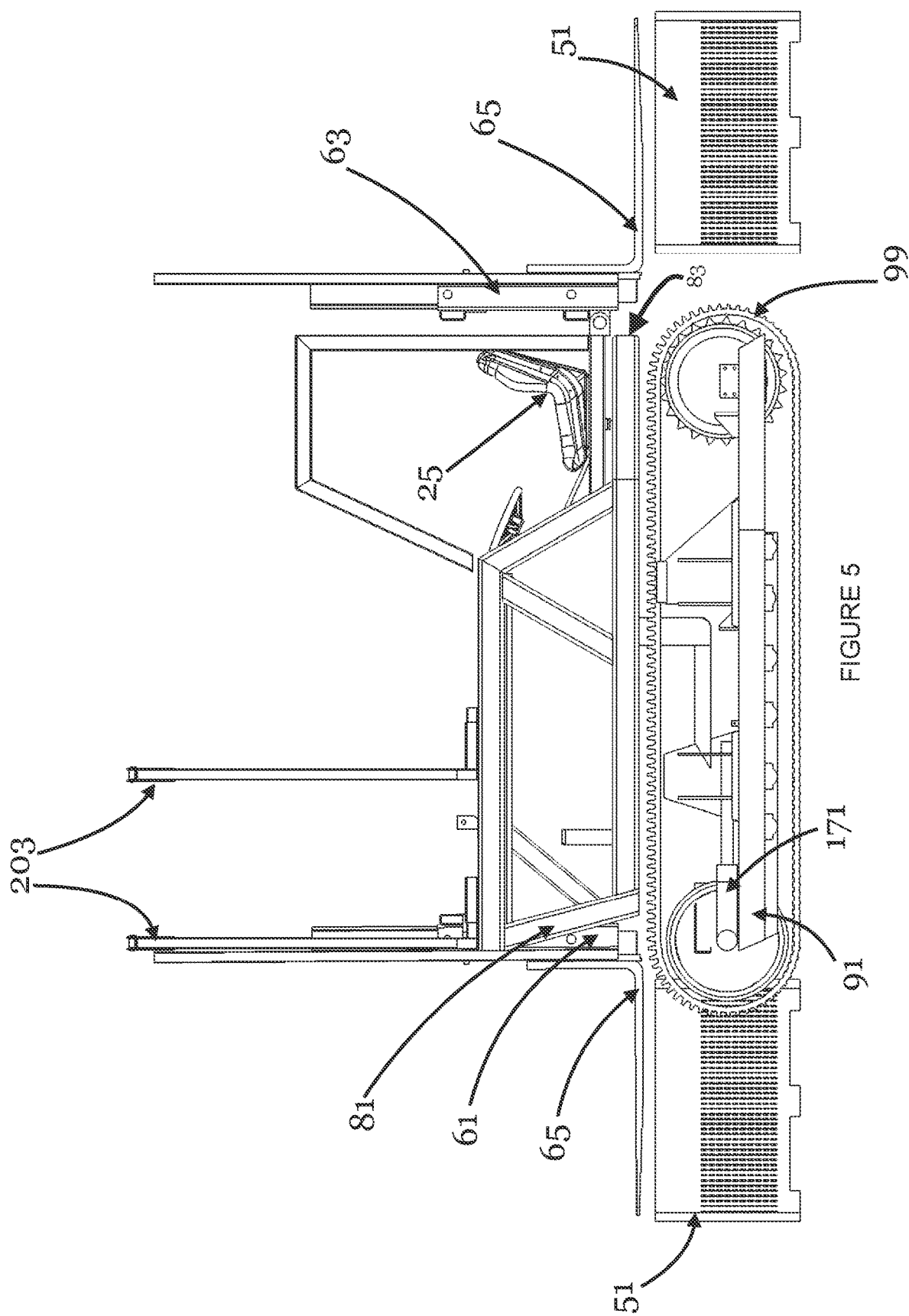
FIG. 5 is a side view of a preferred embodiment of the Straddle fork vehicle of the present invention straddling both front and rear pallet boxes.

A pallet bin 51 may be straddled by the straddle fork vehicle 21 and lifted up by either the first fork assembly 61 or the second fork assembly 63 as shown in FIGS. 5 and 7. Because of the straddle area 45, it is possible for the straddle fork vehicle 21 to pick-up pallet bins 51 from an orchard row out of order. For example, if some pallet bins further down a row are filled to capacity, thus ready to be harvested before others, the straddle fork vehicle 21 may efficiently pass over any intervening pallets not ready to be picked up en route to pallets ready for harvesting.

Efficient and therefore speedy pallet harvesting is crucial to farming profitability. Depending upon weather and temperature, it may be advantageous to remove collected crops from sunlight, heat, humidity, or other detrimental environmental conditions, as soon as possible. Being able to lift and remove pallet bins out of order makes these considerations possible.

In addition, because of the straddle area 45, as well as the configuration of the first fork assembly 61 and second fork assembly 63, it is possible for the inventive straddle fork vehicle 21 to carry multiple pallet bins on both the first fork assembly 61 and second fork assembly 63 at the same time. Preferably, each fork assembly can carry at least four pallet bins, if not more, depending on their size and configuration and of each pallet bin. When either the first fork assembly 61 and second fork assembly 63 is carrying one or more pallet bins 51, the distributed contact surface area helps the straddle fork vehicle 21 maintain stability and balance as the center of gravity shifts. Depending on the number of pallet bins 51 on either assembly, the first fork assembly 61 may be moved horizontally forward or backward to shift the center of gravity of the straddle fork vehicle 21 to a more stable position. Such horizontal movement of the first forklift assembly 61, in particular, minimizes the probability that counterweights may be needed to maintain straddle fork vehicle 21 stability while carrying pallet bins 51.

The straddle fork vehicle 21 preferably includes a low-emission or eco-engine 151 mounted adjacent to the operator cabin 25 as shown in FIG. 3. A preferred embodiment of the low-emission engine 151 is a Tier 4 diesel engine or similar low-emission engine. As with other straddle fork vehicle 21 components, the low-emission engine 151 is preferably mounted above the first tread belt 93 and second tread belt 95 so as not to obstruct the straddle area 45. The straddle fork vehicle 21 preferably uses a hydrostatic transmission to connect the low-emission engine 151 to the track drive system 91.

The straddle fork vehicle 21 preferably uses has a hydraulic powered fan assembly 191 to cool the engine 151 rather than a drive belt powered fan as is typically used. This hydraulic configuration allows for the fan assembly 191 to be positioned anywhere on the frame 23 rather than in-line with the engine block 151 as is required in belt driven systems. This modification permits greater flexibility to juxtapose the fan 191 with the low-emission engine 151, thus allowing for a shorter engine compartment.

The low-emission engine 151 is coupled to the fan assembly 191 to reduce the physical length of the engine as shown in FIG. 3. This reduction in engine dimension allows for a shorter overall straddle fork vehicle 21. The shorter length frame allows for greater maneuverability in the field.

In addition, the low-emission engine 151 preferably has a braking system 171 using hydraulic charge pressure to release the brakes for locomotion as shown in FIG. 7. In this way, if the low-emission engine 151 stops functioning or the braking system 171 otherwise loses charge pressure, the brakes fail-to-set. In addition, in an emergency, the brake system 171 may be set to dump pressure so the brakes can be set. This is an advantage over prior art vehicles where a failure of the braking system 171 may result in the straddle fork vehicle 21 being unrestrained or a loss of brake fluid into the environment.

Repetitive trips by the straddle fork vehicle 21, or any vehicle, down a given orchard row can be detrimental to ground soil integrity. The resultant soil compacting may result in undesirable water run-off among other side effects. The inventive straddle fork vehicle 21 may optionally include a ripper 201 or similar tool to till or disturb any orchard row soil that has been compacted. The ripper 201 may be configured to be in lieu of or attached to the second fork assembly 63. Alternatively, the ripper 201 may be provided as a drop-down tool to be used when the second fork assembly 63 is raised and the inventive straddle fork vehicle 21 is leaving the field.

Although multiple embodiments have been described in detail for purposes of illustration, various modifications may be made without departing from the scope and spirit of the invention. Accordingly, the invention is not to be limited, except as by the appended claims.

The invention claimed is:

1. A straddle fork vehicle for use with agricultural pallets, comprising:
   a vehicle frame structure having a first end and a second end opposite to the first end;
   an operator cabin disposed at the second end of the vehicle frame structure;
   an eco-engine proximate to and operationally connected to the operator cabin, wherein said eco-engine is functionally coupled to a hydraulic cooling fan assembly;
   a first fork assembly mounted on the first end and a second fork assembly mounted on the second end, wherein each of the first fork assembly and second fork assembly are movable vertically relative to the vehicle frame structure;
   a track drive system comprising a pair of tread belts longitudinally associated with and externally attached to opposite sides of said vehicle frame structure;
   a hydraulic brake system functionally coupled to said pair of tread belts and operationally connected to the operator cabin; and
   a straddle area defining a vertical clearance and a horizontal clearance beneath the vehicle frame structure spanning from the first end to the second end and between the pair of tread belts, wherein the straddle area is configured to accommodate the agricultural pallets as a passthrough.

2. The straddle fork vehicle of claim 1, wherein the straddle area is configured to a height no less than four feet and width no less than four feet.

3. The straddle fork vehicle of claim 1, wherein said pair of tread belts each comprise a plurality steel treads or a plurality of rubber treads.

4. The straddle fork vehicle of claim 1, further comprising a pair of adjustment rails longitudinally disposed at the first end extending toward the second end, wherein the first fork assembly is mounted on the pair of adjustment rails.

5. The straddle fork vehicle of claim 4, wherein said first fork assembly is slidable along the pair of adjustment rails relative to the first end of the vehicle frame structure as needed to balance the straddle fork vehicle.

6. The straddle fork vehicle of claim 1, further comprising a ripper assembly selectively attachable to either the first fork assembly or the second fork assembly.

7. The straddle fork vehicle of claim 1, wherein the hydraulic brake system is configured to use charge pressure to release the brake system.

8. The straddle fork vehicle of claim 1, wherein the track drive system is operationally connected to the engine by a hydrostatic transmission.

9. The straddle fork vehicle of claim 8, wherein the pair of tread belts are each independently controllable by the hydrostatic transmission.

10. A straddle fork vehicle for use with agricultural pallets, comprising:
    a vehicle frame structure having a first end and a second end opposite to the first end, and a pair of adjustment rails longitudinally disposed at the first end extending toward the second end;
    an operator cabin disposed at the second end of the vehicle frame structure;
    an eco-engine proximate to and operationally connected to the operator cabin, wherein said eco-engine is functionally coupled to a hydraulic cooling fan assembly;
    a first fork assembly mounted on the pair of adjustment rails and a second fork assembly mounted on the second end, wherein each of the first fork assembly and second fork assembly are movable vertically relative to the vehicle frame structure;
    a track drive system comprising a pair of tread belts longitudinally associated with and externally attached to opposite sides of said vehicle frame structure, wherein the track drive system is operationally connected to the engine by a hydrostatic transmission;
    a hydraulic brake system functionally coupled to said pair of tread belts and operationally connected to the operator cabin; and
    a straddle area defining a vertical clearance and a horizontal clearance beneath the vehicle frame structure spanning from the first end to the second end and between the pair of tread belts, wherein the straddle area is configured to accommodate the agricultural pallets as a passthrough.

11. The straddle fork vehicle of claim 10, wherein the straddle area is configured to a height no less than four feet and width no less than four feet.

12. The straddle fork vehicle of claim 10, wherein said pair of tread belts each comprise a plurality steel treads or a plurality of rubber treads.

13. The straddle fork vehicle of claim 10, wherein said first fork assembly is slidable along the pair of adjustment rails relative to the first end of the vehicle frame structure as needed to balance the straddle fork vehicle.

14. The straddle fork vehicle of claim 10, further comprising a ripper assembly selectively attachable to either the first fork assembly or the second fork assembly.

15. The straddle fork vehicle of claim 10, wherein the hydraulic brake system is configured to use charge pressure to release the brake system.

16. The straddle fork vehicle of claim 10, wherein the pair of tread belts are each independently controllable by the hydrostatic transmission.

17. A straddle fork vehicle for harvesting agricultural pallets, comprising:
    a vehicle frame structure having a first end and a second end opposite to the first end, and a pair of adjustment rails longitudinally disposed at the first end extending toward the second end;
    an operator cabin disposed at the second end of the vehicle frame structure;
    an eco-engine proximate to and operationally connected to the operator cabin, wherein said eco-engine is functionally coupled to a hydraulic cooling fan assembly;
    a first fork assembly mounted on the pair of adjustment rails and a second fork assembly mounted on the second end, wherein each of the first fork assembly and second fork assembly are movable vertically relative to the vehicle frame structure, wherein the first fork assembly is slidable along the pair of adjustment rails relative to the first end of the vehicle frame structure as needed to balance the straddle fork vehicle;
    a track drive system comprising a pair of tread belts longitudinally associated with and externally attached to opposite sides of said vehicle frame structure, wherein the track drive system is operationally connected to the engine by a hydrostatic transmission and the pair of tread belts are each independently controllable by the hydrostatic transmission;

a hydraulic brake system functionally coupled to said pair of tread belts and operationally connected to the operator cabin; and a straddle area defining a vertical clearance and a horizontal clearance beneath the vehicle frame structure spanning from the first end to the second end and between the pair of treads, wherein the straddle area is configured to accommodate the agricultural pallets as a passthrough.

18. The straddle fork vehicle of claim 17, wherein the straddle area is configured to a height no less than four feet and width no less than four feet.

19. The straddle fork vehicle of claim 17, wherein said pair of tread belts each comprise a plurality steel treads or a plurality of rubber treads.

20. The straddle fork vehicle of claim 17, wherein the hydraulic brake system is configured to use charge pressure to release the brake system.

* * * * *